(12) United States Patent
Marvin et al.

(10) Patent No.: US 10,919,622 B2
(45) Date of Patent: *Feb. 16, 2021

(54) ADVANCED EMERGENCY COLLECTIVE ACTUATOR WITH FRICTION PULL-OFF AND METHOD FOR A HELICOPTER

(71) Applicant: Merlin Technology, Inc., Kent, WA (US)

(72) Inventors: Mark Marvin, Tacoma, WA (US); John E. Mercer, Gig Harbor, WA (US); Derek Vetter, Olympia, WA (US)

(73) Assignee: Merlin Technology, Inc., Kent, WA (US)

( * ) Notice: Subject to any disclaimer, the term of this patent is extended or adjusted under 35 U.S.C. 154(b) by 207 days.

This patent is subject to a terminal disclaimer.

(21) Appl. No.: 15/926,972

(22) Filed: Mar. 20, 2018

(65) Prior Publication Data

US 2018/0208303 A1 Jul. 26, 2018

Related U.S. Application Data

(63) Continuation of application No. 15/158,521, filed on May 18, 2016, now Pat. No. 9,957,041.

(Continued)

(51) Int. Cl.
| | |
|---|---|
| *B64C 27/57* | (2006.01) |
| *B64C 27/56* | (2006.01) |
| *B64C 27/00* | (2006.01) |

(52) U.S. Cl.
CPC ............ *B64C 27/57* (2013.01); *B64C 27/006* (2013.01); *B64C 27/56* (2013.01)

(58) Field of Classification Search
CPC ....... B64C 27/006; B64C 27/56; B64C 27/57; B64C 27/58; B64C 27/59
See application file for complete search history.

(56) References Cited

U.S. PATENT DOCUMENTS

| 2,941,605 A | 6/1960 | Sikorsky |
|---|---|---|
| 2,953,207 A | 9/1960 | Hofmann |
| (Continued) | | |

FOREIGN PATENT DOCUMENTS

| GB | 2192163 A | 1/1988 |
|---|---|---|
| SU | 170303 A | 4/1965 |
| SU | 533017 A | 10/1986 |

OTHER PUBLICATIONS

Air Accidents Investigation Branch (AAIB), Robinson R22 Beta, G-BUIW, Nov. 1998, AAIB Bulletin No. 11/98.

(Continued)

*Primary Examiner* — Joseph W Sanderson
(74) *Attorney, Agent, or Firm* — Pritzkau Patent Group LLC

(57) ABSTRACT

An emergency collective actuator includes an actuator motor to produce an actuation force and an actuator linkage that directly engages a friction control lever that is pivotally supported on the collective stick of a helicopter to apply the actuation force directly to the friction control lever such that the actuation force initially disengages the friction control and then reduces the adjustable pitch toward a minimum collective pitch position. The actuator can include a clutch that slips to allow the pilot to overcome the actuation force and that slips responsive to an engagement of the friction control by the pilot, but otherwise the clutch co-rotates with the motor shaft to bias the adjustable pitch toward a minimum collective pitch position.

12 Claims, 5 Drawing Sheets

Related U.S. Application Data

(60) Provisional application No. 62/165,085, filed on May 21, 2015.

(56) References Cited

U.S. PATENT DOCUMENTS

| | | | |
|---|---|---|---|
| 4,667,909 | A | 5/1987 | Curci |
| 7,223,071 | B2 | 5/2007 | Certain |
| 7,756,612 | B2 | 7/2010 | Salesse-Lavergne |
| 8,360,369 | B2 | 1/2013 | Mercer et al. |
| 8,651,425 | B2 | 2/2014 | Mercer et al. |
| 8,910,909 | B2 | 12/2014 | Mercer et al. |
| 9,511,856 | B2 | 12/2016 | Mercer |
| 9,789,958 | B2 | 10/2017 | Mercer |
| 9,821,908 | B2 | 11/2017 | Schaeffer |
| 9,957,041 | B2 * | 5/2018 | Marvin .................. B64C 27/006 |

OTHER PUBLICATIONS

The International Search Report and the Written Opinion of the International Searching Authority for International Application No. PCT/US2016/033376 which is associated with U.S. Appl. No. 15/158,521, dated Sep. 15, 2016, Moscow, Russia.

International Preliminary Report on Patentability for International Application No. PCT/US2016/033376 which is associated with U.S. Appl. No. 15/158,521, dated Nov. 21, 2017, Geneva, Switzerland.

First Office Action for Chinese Application No. 201680030817.0, which is associated with International Application No. PCT/US2016/033376 which is associated with U.S. Appl. No. 15/158,521, dated Apr. 19, 2018. (Machine translation included).

First Office Action for Russian Application No. 2017141545, which is associated with International Application No. PCT/US2016/033376 which is associated with U.S. Appl. No. 15/158,521, dated Mar. 26, 2018. (Machine translation included).

Search Report for Russian Application No. 2017141545, which is associated with International Application No. PCT/US2016/033376 which is associated with U.S. Appl. No. 15/158,521, dated Mar. 22, 2018.

\* cited by examiner

ADVANCED EMERGENCY COLLECTIVE ACTUATOR WITH FRICTION PULL-OFF AND METHOD FOR A HELICOPTER

RELATED APPLICATION

The present application is a continuation application of copending U.S. patent application Ser. No. 15/158,521 filed on May 18, 2016, which claims priority from U.S. Provisional Patent Application Ser. No. 62/165,085 filed on May 21, 2015, each of which are hereby incorporated by reference in their entirety.

BACKGROUND

The present invention is related at least generally to helicopter control systems and, more particularly, to an emergency collective actuator having a friction pull-off and associated method for a helicopter.

It is recognized in the prior art such as is exemplified by U.S. Pat. No. 4,667,909 (hereinafter the '909 patent) that a sudden power failure during the flight of a helicopter requires the immediate attention of the pilot to convert to autorotation by lowering the collective pitch of the main rotor blades of the helicopter. A failure to timely reduce the collective can result in stalling the rotor blades. Such stalling of the rotor blades will generally produce a catastrophic crash wherein the helicopter, quite literally, falls from the sky. One example of such an accident, which likely involved a rotor stall, occurred in the United Kingdom in March of 1998 and is the subject of AAIB Bulletin no. 11/98. Such an accident will generally be fatal to anyone onboard the aircraft. The particular helicopter that was involved in this accident was the Robinson R22, which is a lightweight helicopter having a low-inertia rotor system. It should be appreciated that a low-inertia rotor system can be stalled more easily than a rotor system having a greater level of inertia. The subject accident report outlines operational conditions for the Robinson R22 under which rotor speed will decay to an unrecoverable value in less than 1 second during a climb.

As a solution, Applicant developed an emergency collective pull-down apparatus that is described in U.S. Pat. No. 8,360,369 (hereinafter, the '369 patent), issued Nov. 23, 2010, and U.S. Pat. No. 8,651,425 (hereinafter, the 425 patent), issued May 23, 2012, each of which patents is hereby incorporated by reference. The disclosed apparatus, of the '369 and '425 patents, applies a collective pull-down force directly to the collective control. While the '369 and '425 patents represented a significant leap in the then-existing state-of-the-art and continue to provide benefits in terms of enhancing flight safety in a light helicopter, Applicant now brings to light an emergency collective actuator which provides still further benefits.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In general, an apparatus is described for use with a helicopter including a rotor system having a main rotor with an adjustable pitch that is controlled at least in part by a pilot using a collective control and the collective control pivotally supports a friction control lever as part of a friction control that is engageable by the pilot to selectively increase a control force that is required as a minimum to move the collective control.

In one aspect of the disclosure, the apparatus includes an actuator including a motor having an output shaft for rotation to change the adjustable pitch by exerting an actuation force and an actuator linkage that engages the friction lever to apply the actuation force directly to the friction control lever such that the actuation force initially disengages the friction control to decrease the control force and, thereafter, reduces the adjustable pitch toward a minimum collective pitch position. A control arrangement is configured to receive a signal that is indicative of a low rotor RPM condition and to respond to the signal by activating the actuator arrangement to exert the actuation force.

In another aspect of the disclosure, an actuator arrangement includes a motor having an output shaft for rotation to change the adjustable pitch by exerting an actuation force and a clutch supported by the output shaft and in operative communication with the collective control such that the clutch slips relative to the output shaft (i) to allow the pilot to overcome the actuation force using the collective control and (ii) responsive to an engagement of the friction control by the pilot, but otherwise the clutch co-rotates with the motor shaft to bias the adjustable pitch toward a minimum collective pitch position. A control arrangement is configured to receive a signal that is indicative of a low rotor RPM condition and to respond to the signal by activating the actuator arrangement to exert the actuation force.

BRIEF DESCRIPTION OF THE DRAWINGS

Example embodiments are illustrated in referenced figures of the drawings. It is intended that the embodiments and figures disclosed herein are to be illustrative rather than limiting.

DETAILED DESCRIPTION

The following description is presented to enable one of ordinary skill in the art to make and use the invention and is provided in the context of a patent application and its requirements. Various modifications to the described embodiments will be readily apparent to those skilled in the art and the generic principles taught herein may be applied to other embodiments. Thus, the present invention is not intended to be limited to the embodiment shown, but is to be accorded the widest scope consistent with the principles and features described herein including modifications and equivalents. It is noted that the drawings are not to scale and are diagrammatic in nature in a way that is thought to best illustrate features of interest. Descriptive terminology may be adopted for purposes of enhancing the reader's understanding, with respect to the various views provided in the figures, and is in no way intended as being limiting.

As discussed above, the '369 and '425 patents continue to provide enhanced flight safety in light helicopters. At this juncture, however, Applicant recognizes that still further improvements can be provided. In this regard, weight is a precious commodity, particularly in light helicopters. Any reduction of the weight of control components in a helicopter is desirable with the caveat that there can be no compromise in flight safety solely for the sake of weight reduction. One approach to this concern is to simply substitute redesigned lightweight components for original components, with the lightweight components being proven as even more robust than the original components. Applicant, however, brings to light a completely different approach that allows for a reduction in the physical weight as well as size of an emergency collective actuator without introducing a safety compromise. By way of background, most helicopters include a friction control that allows the pilot to set or lock the collective stick or control into a given position such that pilot can at least momentarily release his or her hand from the collective stick to perform other actions. During normal operation of the helicopter, the collective control will not move when the friction control is engaged, although the pilot can overcome the resistance of the friction control and move the collective stick, for example, in response to an emergency. As will be seen, the advanced approach of the present application involves automated manipulation of the friction control that is provided as a standard feature in association with the helicopter. This advanced approach provides for reducing both the physical weight and dimensions of the emergency collective actuator.

Figure 1:
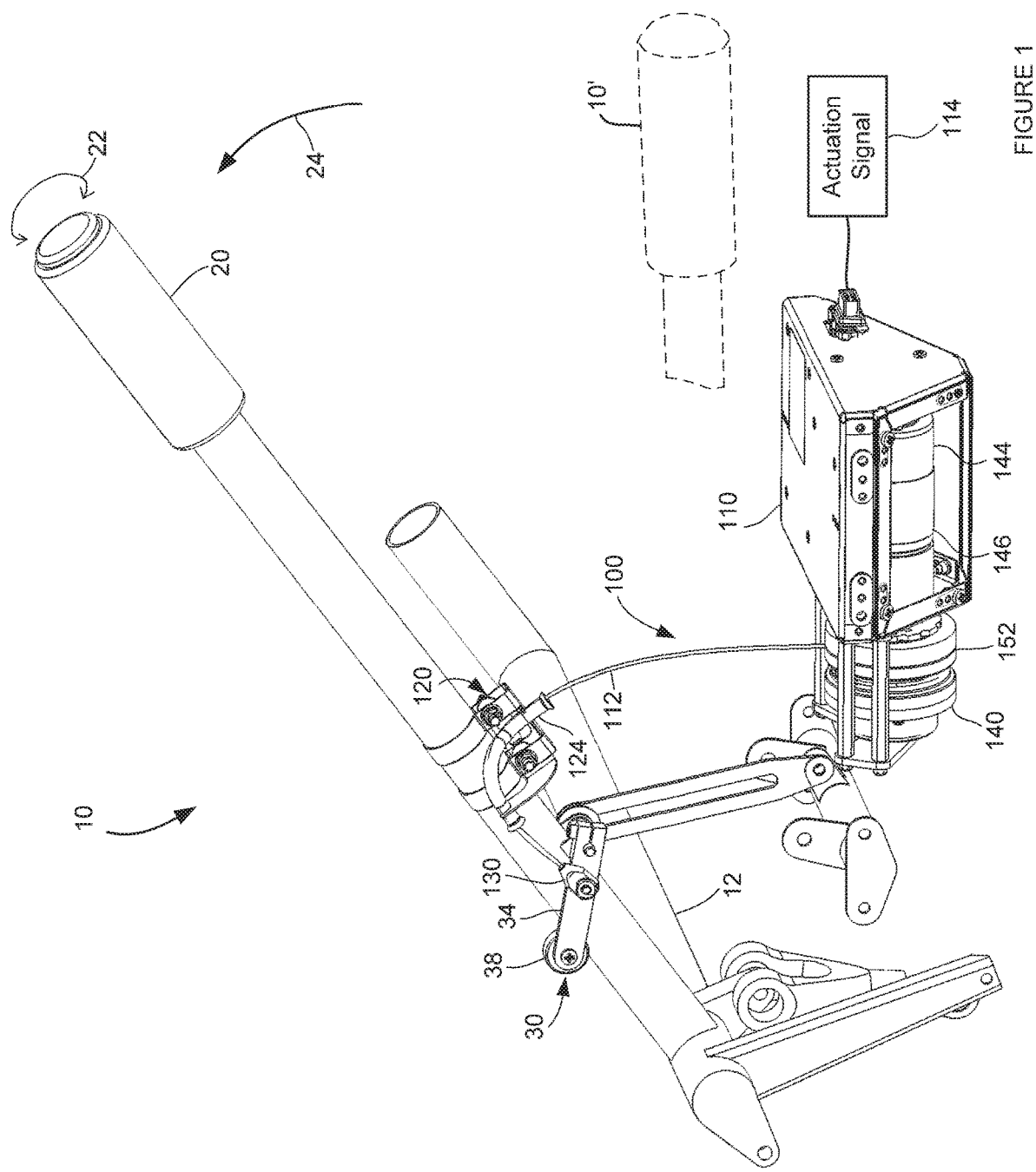
FIG. 1 is a diagrammatic view, in perspective, of an embodiment of a helicopter collective control coupled with an emergency collective actuator of the present disclosure.
Figure 2:
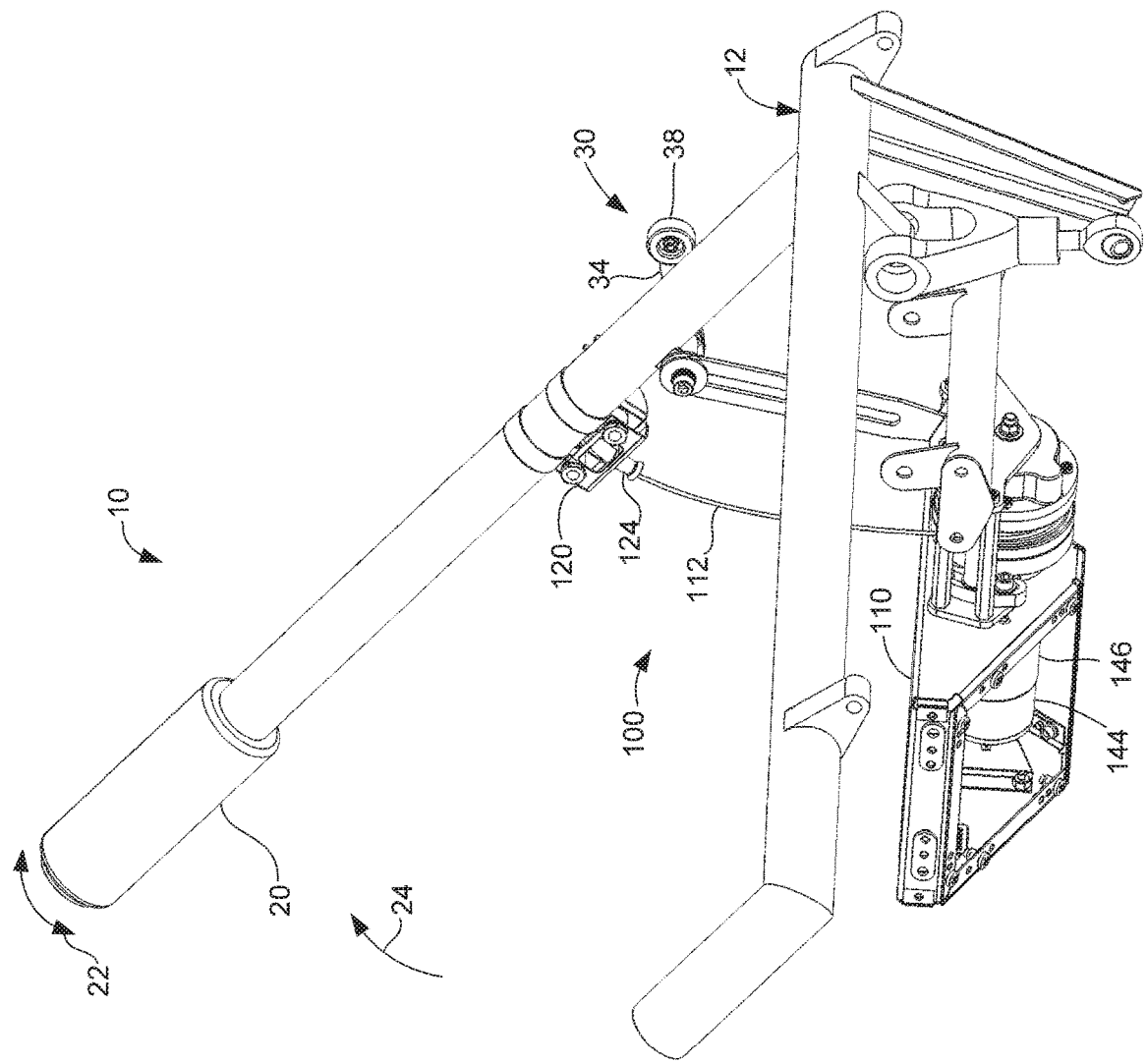
FIG. 2 is another diagrammatic view, taken from a different perspective, of the embodiment of the helicopter collective control and emergency collective actuator of FIG. 1.

Attention is now directed to the figures wherein like reference numbers may refer to like items throughout the various views. FIGS. 1 and 2 are diagrammatic illustrations, in differing perspective views, of a helicopter collective control that is generally indicated by the reference number 10 and which is representative of the collective control in a helicopter such as, for example, the Robinson R22. It is noted that the collective control changes the pitch of all the blades of the main rotor in unison or collectively for purposes of controlling lift. Collective control 10 pivots about points 12 proximate to a pivot end of the collective control. A handle or free end 20 of the collective control is configured for gripping by a pilot and includes a throttle control that is actuatable by twisting handle 20 as indicated by a double headed arrow 22. The pilot can increase the collective by moving handle 20 pivotally in the direction indicated by an arrow 24 or reduce collective by moving handle 20 oppositely. FIGS. 1 and 2 illustrate the collective control in a fully raised position while FIG. 1 further illustrates the collective control at a fully lowered position in phantom using dashed lines and indicated by the reference number 10'.

Figure 3:
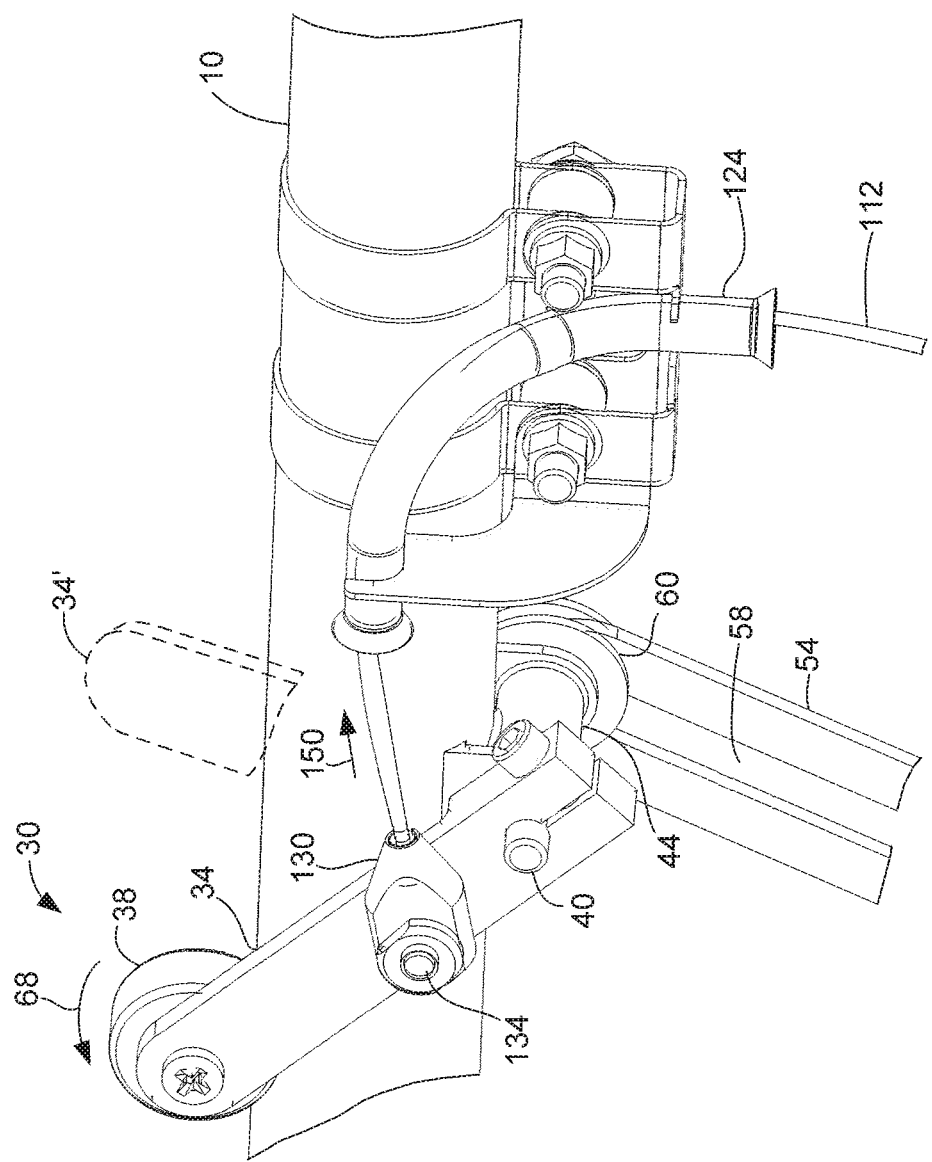
FIGS. 3 and 4 are further enlarged cutaway diagrammatic views, in perspective, illustrating details of a friction control and collective control as well as an embodiment of the interface of the friction control to the emergency collective control of the present application.
Figure 4:
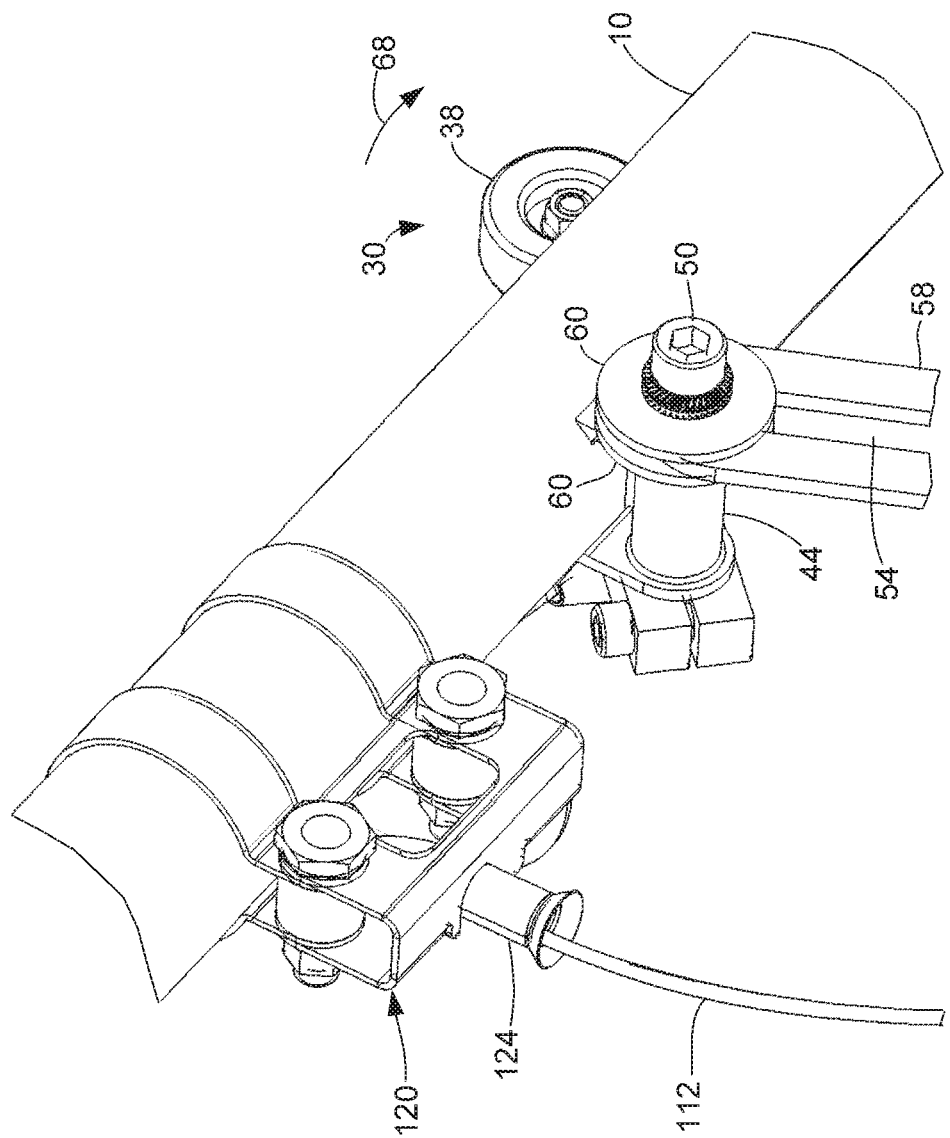

Attention is now directed to FIGS. 3 and 4 in conjunction with FIGS. 1 and 2. FIGS. 3 and 4 are diagrammatic, further enlarged partially cut-away views, in perspective, illustrating details of a friction control, generally indicated by the reference number 30. The friction control includes a friction control lever 34 having a distal end that supports a control knob 38 that is accessible by the pilot. An opposing end of the friction control lever is supported by a shaft 40 with the friction control lever being clamped to the shaft. The latter is threadingly received by a tube 44 (FIGS. 3 and 4) that is itself supported by the collective control. As best seen in FIG. 4, shaft 40 is terminated by a head 50. The shaft, proximate to head 50 extends through an elongated slot 54 that is defined by a friction bar 58. Shaft 40 supports a pair of friction washers such that a friction washer 60 is received against each side of friction bar 58 and captured between tube 44 and head 50. The friction control is shown in an engaged position such that the pilot has rotated friction control lever 34 in a direction that is indicated by an arrow 68. Accordingly, the rotation of the friction control lever causes shaft 40 to threadingly engage tube 44 in a way that selectively biases friction washers 60 against the sides of friction bar 58 to allow the pilot to at least temporarily lock the collective control in position such that the friction bar will not move inadvertently, but the pilot can affirmatively move the collective control by overcoming the friction force. During movement of the collective control, shaft 40 slides in slot 54 of the friction bar to allow for normal movement of the collective by the pilot and to allow the pilot to set the collective to any selected position using the friction control so that the pilot is able to at least momentarily release his or her hand from the collective control. Having described the friction control of the Robinson R22, it should be appreciated that the teachings that have been brought to light herein can readily be applied without limitation to pull-off the friction control of other helicopters prior to lowering the collective, irrespective of whether the friction control is implemented with mechanical or electronic actuation.

Referring again to FIG. 1, an emergency friction pull-off collective actuator is generally indicated by the reference number 100. The emergency actuator includes a main unit 110 that can be configured to receive an actuation signal 114 such as, for example, a Low RPM signal that is generated by the helicopter. In another embodiment, an autopilot can generate the activation signal. In the instance of the Robinson R22, the Low RPM signal is produced when the rotor speed falls to 97% of normal or less. Normally, the Low RPM signal is used to actuate a warning horn and light to draw the pilot's attention to the status of the rotor speed. The manner in which main unit 110 uses the activation signal will become evident in the discussions which follow.

A control cable or actuator linkage 112 extends from main unit 110 to a guide tube arrangement 120 (best seen in FIGS. 3 and 4). The guide tube arrangement can be clamped, as shown, or otherwise fixed to a suitable intermediate position on the collective control that is forward of friction control 30. It is noted that the term "forward", with reference to direction, is intended to indicate a direction toward the front or nose of the helicopter. The guide tube arrangement can be located sufficiently away from the friction control and the pivot end of the collective control so as to avoid any interference with normal operation of the collective control or with actuation by the pilot. The guide tube arrangement includes a guide tube 124 through which cable 112 is extended such that the guide tube translates motion of the cable from a generally vertical direction to a direction that is at least generally aligned with the elongated length of the collective control. The guide tube can be formed from any suitable material such as, for example, stainless steel and is not limited to the specific shape that has been illustrated. In the present embodiment, cable 112 is terminated by an end fitting 130 that is pivotally received at an intermediate position along a length of friction control lever 34, for example, using a fastener 134.

Main unit 110 includes a pulley arrangement 140 that receives cable 112 and a motor 144 can drive a gear box 146 for rotating the pulley arrangement in a direction that takes up the cable. The pulley arrangement can apply a light retraction force on cable 112 that is sufficient to avoid slack in the cable as the pilot moves the collective. In response to actuation signal 114, main unit 110 retracts cable 112 so as to apply force to friction control lever 34 at least generally in a direction that is indicated by an arrow 150. In this way, friction control lever 34, if engaged, is initially moved in a disengagement direction, opposite arrow 68, such that friction control 30 is at least essentially disengaged without moving the collective control. Once the friction control lever rotates at least substantially to a disengaged or released position (indicated by the reference number 34' and shown in phantom using dashed lines in FIG. 3) at which the friction lever stops rotating, the force that is applied to friction arm 34 at the end of cable 112 is then translated to an at least generally vertical direction by guide tube 124 to pull down collective 12 toward a minimum collective position. Of course, if the friction control is initially in a released position, the actuation force automatically serves to immediately lower the collective. The actuation force can be applied, by way of non-limiting example, for a suitable period of time, for instance, up to approximately 3 seconds. Actuator 110 can include a clutch 152 such that the clutch can slip, if necessary, once the collective control reaches the minimum collective position. The pilot can also apply an override force to cause the clutch to slip such that the pilot can maintain the position of the collective control or raise the collective control, irrespective of the application of the actuation force. In an embodiment, the clutch can be configured such that the clutch slips if the friction control is engaged to at least some limited extent, thereby maintaining the current position of the collective control. This could occur, for example, responsive to the pilot actively holding the friction control lever in an engaged position, as opposed to holding the collective in position, during the application of the actuation force or if the friction lever is somehow jammed.

Applicants recognize that less than 4 pounds of force, as measured at the pull location on the friction lever, is needed to move the friction lever forward in a disengagement direction while over 6 pounds of force, as measured at the free end of the collective, is needed to move the collective control arm toward the minimum collective position, even when the friction control is in the disengaged position. Applicants further recognize that with the friction control engaged, even to a relatively limited extent, the force required to move the collective control, as applied by either the pilot or the emergency actuator, can be much higher. The significant differential between a first amount of force that is needed to move the friction control lever toward the disengaged position and a second, higher amount of force that is needed to move the collective control toward the minimum position, irrespective of a current setting of the friction control, allows the emergency actuator of the present disclosure to disengage the friction control prior to lowering the collective control. On this basis, the overall physical size of actuator 110 can be reduced, utilizing a relatively smaller motor 144 and gearbox 146. Further, a clutch override force that is applied by a pilot to the collective to prevent the emergency actuator from lowering the collective control can be reduced, thereby making the helicopter more flyable. The reduction of the clutch override force further assists in reducing the tendency of the pilot to apply an upward impulse of force to the collective control when the emergency actuator terminates the application of the actuation force.

Operation of the emergency actuator can proceed automatically in response to reception of actuation signal 114 and can be initiated essentially instantaneously, at least from a practical standpoint, e.g. in 0.001 seconds (1 ms) or less in response to the actuation signal, but in any event significantly less than the reaction time of even an attentive pilot. In one embodiment, the reaction time of main unit 110 can be adjustable, and yet remain far less than the typical reaction time of the pilot to provide a significant safety enhancement. Typically, however, the circuitry will be allowed to react as quickly as it is capable of reacting without introducing any additional delay. As will be described in further detail, the retraction force that is applied to collective control 10 by emergency actuator 100 can be overcome by the pilot, although the force is sufficient to inform the pilot that the unit is attempting to lower the collective when the left hand of the pilot is holding collective handle 20. In an embodiment, the retraction force can be configured such that the collective can be lowered by the emergency actuator only if friction control lever 34 has been moved at least approximately to or within some limited range from a released or disengaged position.

Figure 5:
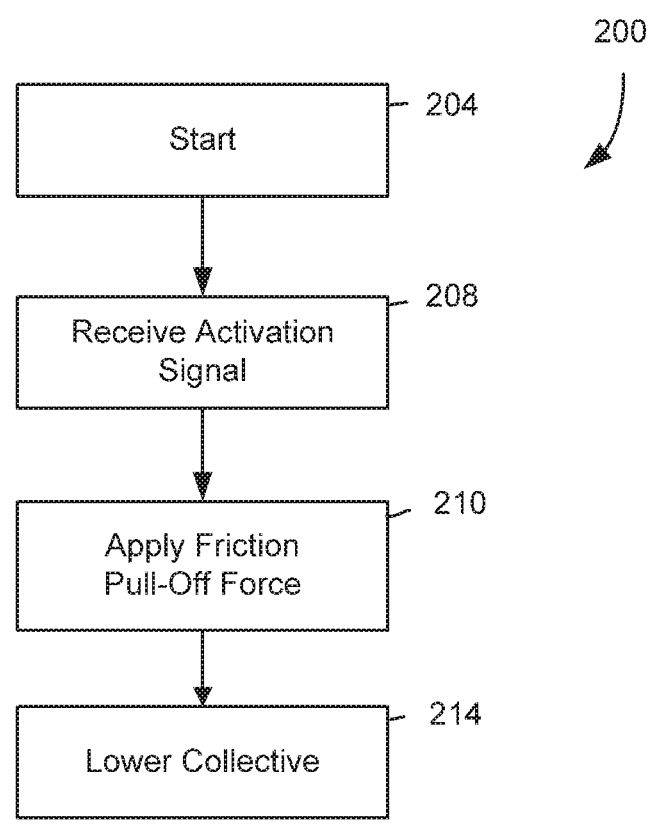
FIG. 5 is a flow diagram illustrating an embodiment of a method for operating an emergency collective actuator in accordance with the present disclosure.

Attention is now directed to FIG. 5 which illustrates an embodiment of a method for operating an emergency collective actuator, according to the present disclosure, having friction pull-off capability, generally indicated by the reference number 200. The method begins at 204 and proceeds to 208 which receives the activation signal. As discussed above, the activation signal, for example, can be a low RPM signal, a signal that is generated by an autopilot or any suitable signal. At 210, an actuator force is applied to the friction control lever to release the friction control from an engaged position, if the friction control is in the engaged position, thereby moving the friction control to a disengaged position. At 214, application of the actuator force continues to lower the collective toward a minimum collective position.

In view of the foregoing, a significant reduction in the size and weight of the emergency collective actuator of the present disclosure is realized. As a result of eliminating the need to overcome additional resistance due to an engaged friction control, the magnitude of actuation force that is needed to pull down the collective does not exceed a minimum amount of force that is need to move the collective stick with the friction control in a disengaged position. Based on this sweeping reduction in the magnitude of actuation force that is needed, virtually all the components of the emergency collective actuator can be made smaller and/or lighter. For example, a smaller electrical drive motor can be used which consumes a lesser amount of electrical power. As another example, the drive motor can drive a smaller, lighter gearbox. Still further benefits are attendant to the advanced emergency collective actuator of the present disclosure. For example, if the pilot chooses to override the actuator from pulling down the collective stick, the pilot has the option of simply engaging and/or holding the friction control lever, as opposed to the collective stick itself. As another, benefit Applicant submits that the relatively lower magnitude of collective actuation force that is applied is less likely to result in over compensation by the pilot when overriding the actuation force.

While a number of exemplary aspects and embodiments have been discussed above, those of skill in the art will recognize certain modifications, permutations, additions and sub-combinations thereof. For example, in some embodiments, a rigid linkage can be used without the need for a flexible cable for purposes of pulling off the friction control and, thereafter, lowering the collective control. It is therefore intended that the following appended claims and claims hereafter introduced are interpreted to include all such modifications, permutations, additions and sub-combinations as are within their true spirit and scope.

What is claimed is:

1. An apparatus for use with a helicopter including a rotor system having a main rotor with an adjustable pitch that is controlled at least in part by a pilot using a collective control and the collective control pivotally supports a friction control lever as part of a friction control that is engageable by the pilot to selectively increase a control force that is required as a minimum to move the collective control, said apparatus comprising:
an actuator including a motor having an output shaft for rotation to change the adjustable pitch by exerting an actuation force;
a flexible cable that applies the actuation force to the friction control lever such that the actuation force initially disengages the friction control to decrease the control force and, thereafter, reduces the adjustable pitch toward a minimum collective pitch position; and
a control arrangement that is configured to receive a signal that is indicative of a low rotor RPM condition and to respond to the signal by activating the actuator to exert the actuation force.

2. The apparatus of claim 1 wherein the actuator includes a pulley arrangement that receives the flexible cable proximate to the actuator and a gear box that rotatably drives the pulley arrangement responsive to rotation of the output shaft of the motor.

3. The apparatus of claim 1 wherein the flexible cable includes a distal end that is pivotally attached to the friction control lever.

4. The apparatus of claim 3 wherein the collective control includes an elongated length and wherein the actuator linkage includes a guide tube configured to support the flexible cable to translate lengthwise motion of the flexible cable from an at least generally vertical direction to a direction that is at least generally aligned with the elongated length of the collective control.

5. The apparatus of claim 4 wherein the guide tube defines a passageway for slidingly receiving the flexible cable therein.

6. The apparatus of claim 5 wherein the guide tube is formed to translate the lengthwise motion.

7. The apparatus of claim 5 wherein the guide tube is supported on the collective control forward of the friction control lever.

8. The apparatus of claim 7 wherein the guide tube is sufficiently spaced apart from the friction control lever to provide for normal travel of the friction control lever between an engaged position and a disengaged position.

9. The apparatus of claim 1 wherein the actuator and the flexible cable cooperate to initially move the friction lever from an engaged position to a disengaged position at which the friction lever stops pivotally rotating.

10. The apparatus of claim 9 wherein the actuator and the flexible cable cooperate to move the collective control toward the minimum collective pitch position after the friction lever reaches the disengaged position.

11. The apparatus of claim 1 wherein the actuator includes a clutch supported by the output shaft such that the clutch slips responsive to an at least partial engagement of the friction control that is maintained by the pilot.

12. The apparatus of claim 1 wherein the actuator includes a clutch supported by the output shaft such that the clutch slips relative to the output shaft of the motor to allow the pilot to overcome the actuation force.

* * * * *